United States Patent [19]

Fujiwara et al.

[11] Patent Number: 5,287,091
[45] Date of Patent: Feb. 15, 1994

[54] PRINTER

[75] Inventors: Masahiro Fujiwara; Izumi Kariya, both of Tokyo, Japan

[73] Assignee: Sony Corporation, Tokyo, Japan

[21] Appl. No.: 47,365

[22] Filed: Apr. 19, 1993

Related U.S. Application Data

[63] Continuation of Ser. No. 644,021, Jan. 22, 1991, abandoned.

[30] Foreign Application Priority Data

Jan. 20, 1990 [JP] Japan .................................. 2-10924

[51] Int. Cl.$^5$ .............................................. G09G 5/12
[52] U.S. Cl. ...................................... 345/146; 358/452; 345/115
[58] Field of Search ................ 340/712, 721, 724, 728, 340/734, 735, 750, 798, 799; 358/452, 453, 462, 22 C; 395/101, 103, 116, 147

[56] References Cited

U.S. PATENT DOCUMENTS

| | | | |
|---|---|---|---|
| 4,190,833 | 2/1980 | Bejting et al. | 340/707 |
| 4,460,918 | 7/1984 | Flasza | 358/224 |
| 4,627,015 | 11/1986 | Stephens | 340/724 |
| 4,684,936 | 8/1987 | Brown et al. | 340/721 |
| 5,019,915 | 5/1991 | Fujito | 358/335 |
| 5,025,396 | 6/1991 | Parks et al. | 340/750 |
| 5,047,864 | 9/1991 | Fujito | 358/296 |
| 5,064,807 | 11/1991 | Yoshida et al. | 503/227 |

FOREIGN PATENT DOCUMENTS

| | | |
|---|---|---|
| 0119396 | 9/1984 | European Pat. Off. |
| 0312301 | 4/1989 | European Pat. Off. |
| 2215554 | 9/1989 | Fed. Rep. of Germany. |
| 63-1179 | 1/1988 | Japan. |
| 63-127890 | 11/1989 | Japan. |
| 63161801 | 1/1990 | Japan. |

OTHER PUBLICATIONS

"NewsMater" user's manual written by Thompson et al., 1986, pp. 1-61.

Primary Examiner—Jeffery Brier
Attorney, Agent, or Firm—Hill, Steadman & Simpson

[57] ABSTRACT

A printer for printing both image information and additional character information superimposed on the image. The printer comprises an additional character information generation circuit, a display circuit for displaying the additional character information generated by the additional character information generation circuit, and a selecting circuit for selecting characters and/or symbols in the additional character information. A plurality of additional character information symbols and/or characters are displayed on a display unit for selection purposes.

14 Claims, 5 Drawing Sheets

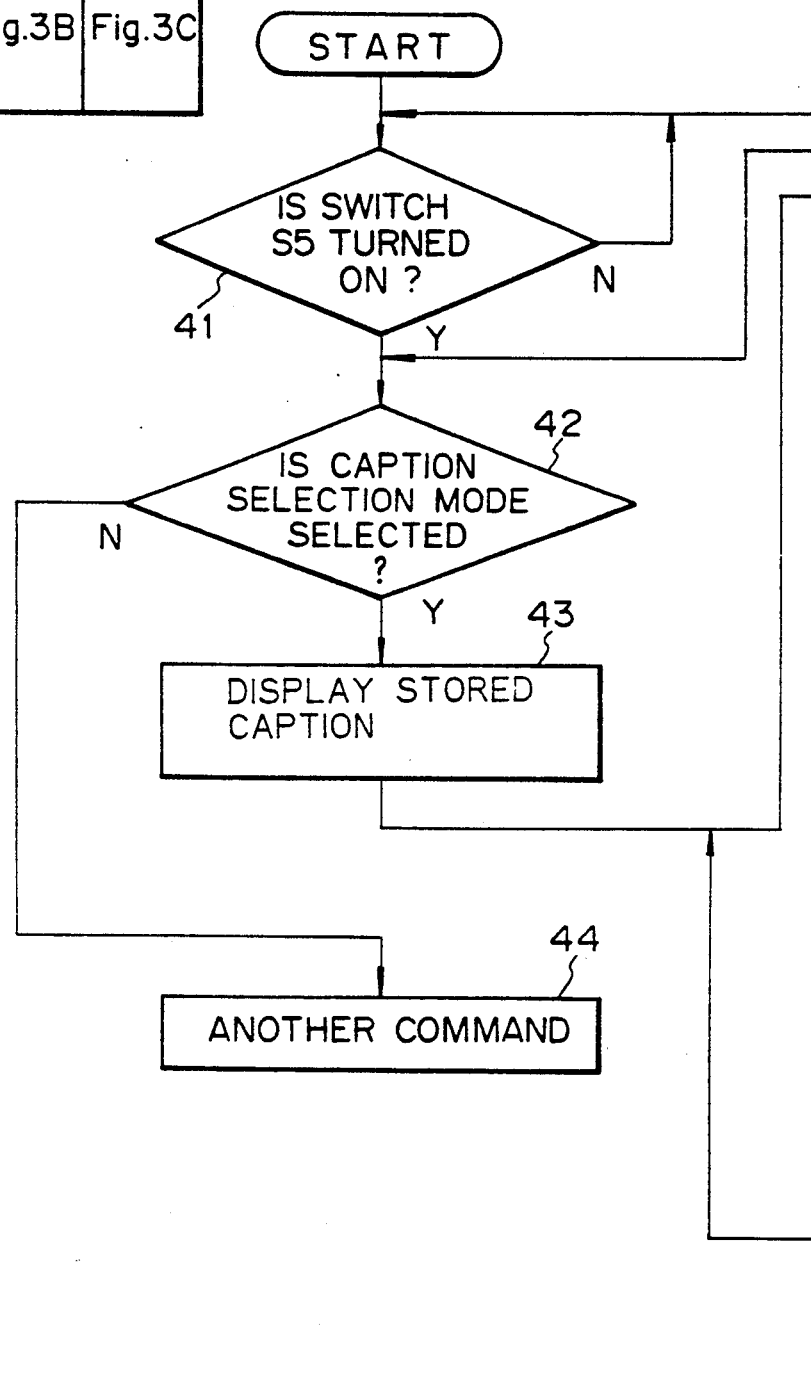

PRINTER

This is a continuation of application Ser. No. 07/644,021 filed Jan. 22, 1991 now abandoned.

BACKGROUND OF THE INVENTION

The present invention relates to printers. Specifically, the invention relates to a printer with means for superimposing additional character information onto/into a printed image.

Video printers for producing hard copies of video images generated by image sources such as tuners, VCR's, video-disc playback units, computers, and so forth are known. A video printer normally is connected to an image display monitor that displays a source (input) image to be printed. Examples of video printers are disclosed in Japanese Patent Application No. SHO 63-127890 and Japanese Patent Application No. SHO 63-161801, the teachings of which are incorporated herein by reference.

It is desirable to print character information (hereinafter referred to as a caption) such as a title for and/or description of an image along with the image to be printed. Hereinafter, the term "caption" refers to a collection of symbols including alphanumeric characters and the like selected to be printed along with an image while the term "character information" refers to symbols which can be used to create a caption. Thus, e.g., character information can include an alphabet while a caption includes a word or words formed by combining selected letters of the alphabet.

One system for accomplishing this creates a caption by operation of a computer and its keyboard, jointly displays a still image and the caption on a monitor, and transmits the caption along with the still image to a printer. This system is disclosed in Japanese Patent Laid-Open Publication No. SHO 63-1179, the teachings of which are incorporated herein by reference.

With respect to a printer, it is possible to create and print a caption along with printed information in a similar manner. However, when the conventional method is applied to a printer, since a caption is input by means of another computer which is not used for the printer, it is necessary to operate a keyboard, i.e., type in the caption information via a keyboard. In addition, the caption being input must be transferred from the computer to the printer through an RS-232-C interface or the like. As a result, the number of key strokes can increase thereby complicating the operation. In addition, a printer that is not equipped with such an interface cannot print the caption.

SUMMARY OF THE INVENTION

The present invention provides a printer capable of receiving a caption via a simple key operation coupled with visualization via a screen of a monitor which is mostly used in a video printer.

In one embodiment of the present invention, there is provided a printer for printing image information with character information which is added to the image information in the form of a caption comprising generating means for generating character information, e.g., alphanumeric characters; a display circuit for displaying the character information on display means; selecting means for selecting one or more desired characters in the character information; control means for controlling the display circuit so as to display the character information on the display means and for determining the desired character in cooperation with the selecting means; and print means for printing the image information and the desired character on a print medium.

The above, and other aspects and features as well as objects and advantages of the present invention will become readily apparent from the following detailed description of the presently preferred embodiment which is to be read in connection with the accompanying drawings.

DETAILED DESCRIPTION OF THE PRESENTLY PREFERRED EMBODIMENT

Figure 1:
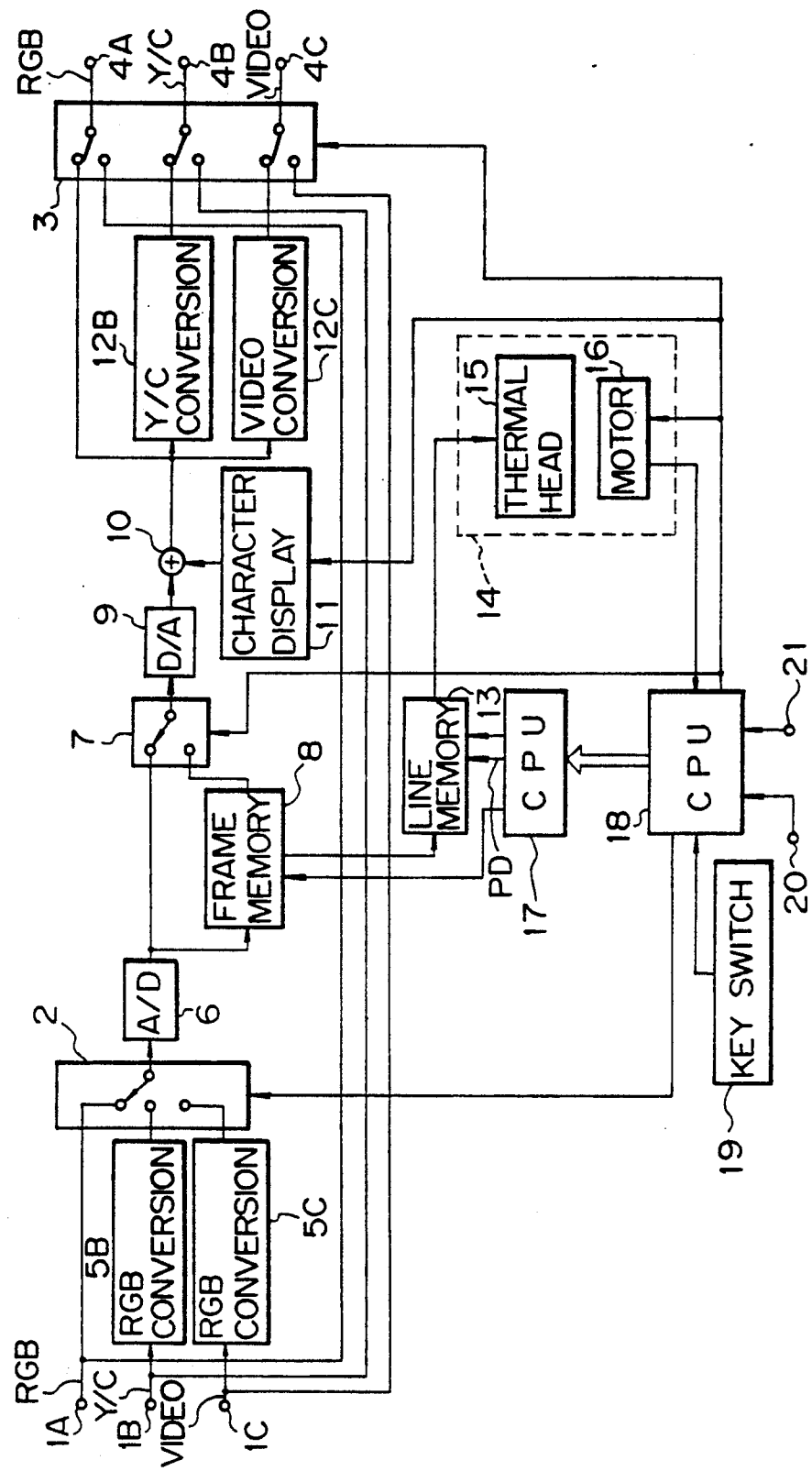
FIG. 1 is a block diagram of an embodiment of the present invention.

In FIG. 1 there is illustrated a circuit diagram of a system for adding a caption or the like to image information so that the caption and print information can be printed together. The system receives as two basic inputs an image signal and a caption information signal. The system then provides as an output either the image signal or a processed signal comprising the image signal altered to include the caption information.

In FIG. 1, reference numerals 1A, 1B, and 1C refer to input terminals; reference numeral 2 refers to an input selection switch; and reference numerals 4A, 4B, and 4C refer to output terminals. The input terminal 1A is a terminal for input of signal of an RGB signal of the image signal. The input terminal 1B is a terminal for input of a luminance signal Y and a color signal C of the image signal. The input terminal 1C is a video terminal for input of a composite color video signal of the image signal.

An image source such as a VCR, video disc playback unit, tuner, or computer is connected to the input terminals 1A, 1B, and 1C. Converting circuits 5B and 5C serve to convert the input signals at terminals 1B and 1C, respectively, into an RGB signal and are connected to the input terminals 1B and 1C, respectively. Then one of either the RGB signal at terminal 1A or the input signals at terminals 1B or 1C converted into RGB signals is selected via appropriate actuation of the input selection switch 2 for further processing.

A mode selection switch 3 switches between one mode for sending the input signals at terminals 1A, 1B, and 1C directly to output terminals 4A, 4B, and 4C, respectively, and another mode for sending the signal processed by the printer to the output terminals 4A, 4B, and 4C. The signal processed by the printer is a signal including a stored image signal, and characters, symbols, and so forth added to the image signal.

A monitor is connected to the output terminals 4A, 4B, and 4C, and the signal output by the system is displayed on the monitor.

The RGB signal from the input selection switch 2 is converted into a digital signal by an A/D converter 6. The output signal of the A/D converter 6 is sent both to one of the input terminals of a switch circuit 7 and to a frame memory 8. The frame memory 8 stores one frame of data to be printed. A signal read from the frame memory 8 is sent to the other input terminal of the switch circuit 7. For a print image, a field or an area obtained by dividing one screen can be used instead of a frame.

The output data of the switch circuit 7 is sent to a D/A converter 9 which restores the digital data into an analog signal. The output signal of the D/A converter 9 is then supplied to a mixer 10. The mixer 10 mixes the image data in the form of the analog signal from the D/A converter 9 with character data to be displayed on the monitor screen supplied by a character display 11. The display of the character data is necessary for displaying both a mode selection menu of the printer and fonts for the creation of caption data. The character display data signal is superimposed on the image data signal.

The output signal from the mixer 10 is output through the mode selection switch 3 to the terminals 4A, 4B, and 4C. As illustrated, the signal is provided directly to terminal 4A in its RGB format form. An RGB to Y/C conversion circuit 12B is interposed between the mixer 10 and terminal 4B so as to form a luminance signal Y and color signal C at terminal 4B. An RGB to video signal conversion circuit 12C is interposed between the mixer 10 and the terminal 4C so as to form a video signal at terminal 4C.

The RGB data stored in the frame memory 8 in addition to being provided to the switch circuit 7 is provided to a line memory 13. An output signal from the line memory 13 is sent to a thermal head 15 of a printing mechanism 14, the printing mechanism 14 being represented by a broken line in FIG. 1. The presently preferred embodiment of such a printing mechanism is a color video printer that utilizes a sublimation type thermal transfer method.

Like a conventional color video printer, the printing mechanism 14 comprises a platen for feeding print paper, a mechanism for sending the print paper to the platen and for exiting the print paper upon completion of the print operation, an ink ribbon having thermally sublimated yellow, cyan, and magenta ink portions in succession, the thermal head 15 for effecting dot printing, a motor 16 for rotating the platen, and so forth. The thermal head 15 and the ink ribbon are employed to print in colors the stored image onto the print paper as it is rolled on the platen.

Reference numeral 17 identifies a CPU for controlling the memories 8 and 13 and the head 15. The CPU 17 controls the write and read operations for the frame memory 8 and the line memory 13. The CPU 17 sends to the line memory 13 caption data PD which is additional character information used to form caption or description images and so forth. A word or phrase correlated to the caption data PD is printed in black characters along with the image, but out of the image print area, that is, on a margin.

Reference numeral 18 identifies a CPU for controlling the system. A key switch 19 is connected to the CPU 18. The CPU 18 is equipped with a terminal 20 for receiving a remote control signal and a terminal 21 for connecting the system to another unit (for example, via an RS-232-C interface).

In addition, output signals of a rotation detector and a sensor associated with the motor 16 of the printing mechanism 14 are sent to the CPU 18. In controlling the system, the CPU 18 sends control data and caption data to the CPU 17. The CPU 18 is operative to control the input selection switch 2, the switch circuit 7, the character display circuit 11, the motor 16, and the mode selection switch 3. In addition, the CPU 18 and the key switch 19 serve to control the input operation of a caption and to store the caption data, as is described below.

Figure 2:
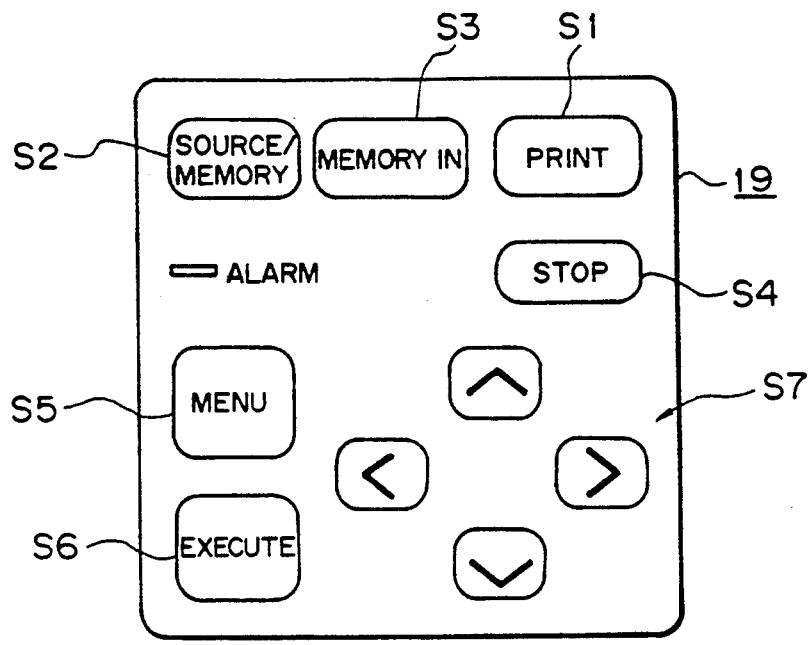
FIG. 2 is a schematic diagram of a key switch.

The key switch 19 preferably is a key pad as shown in FIG. 2 which comprises a plurality of switches. The function of each switch of the key switch 19 will be described in the following.

Switch S1: Labelled "PRINT," this switch is a print switch. When switch S1 is appropriately actuated, the print operation of the stored image and caption data is commenced.

Switch S2: Labelled "SOURCE/MEMORY," this is a switch for controlling the switch circuit 7 which switches between the input (source) signal and the RGB signal stored in the frame memory 8.

Switch S3: Labelled "MEMORY IN," this is a switch for storing a signal in the frame memory 8. When this switch S3 is appropriately actuated, the input image is stored in the frame memory 8 under the control of the CPU's 17 and 18.

Switch S4: Labelled "STOP," this is a stop switch. When this switch is actuated, the print operation and so forth are stopped.

Switch S5: Labelled "MENU," this is a menu switch for evoking a menu and for clearing the menu display on a display screen.

Switch S6: Labelled "EXECUTE," this is a switch for effecting reading selected character data and for executing any function in the caption selection mode.

Cursor switches S7: These switches are employed as cursor keys for moving the cursor on the screen to a desired position.

By operating the switches S5 and S6 and the cursor key S7, a caption is created.

Figure 3B:
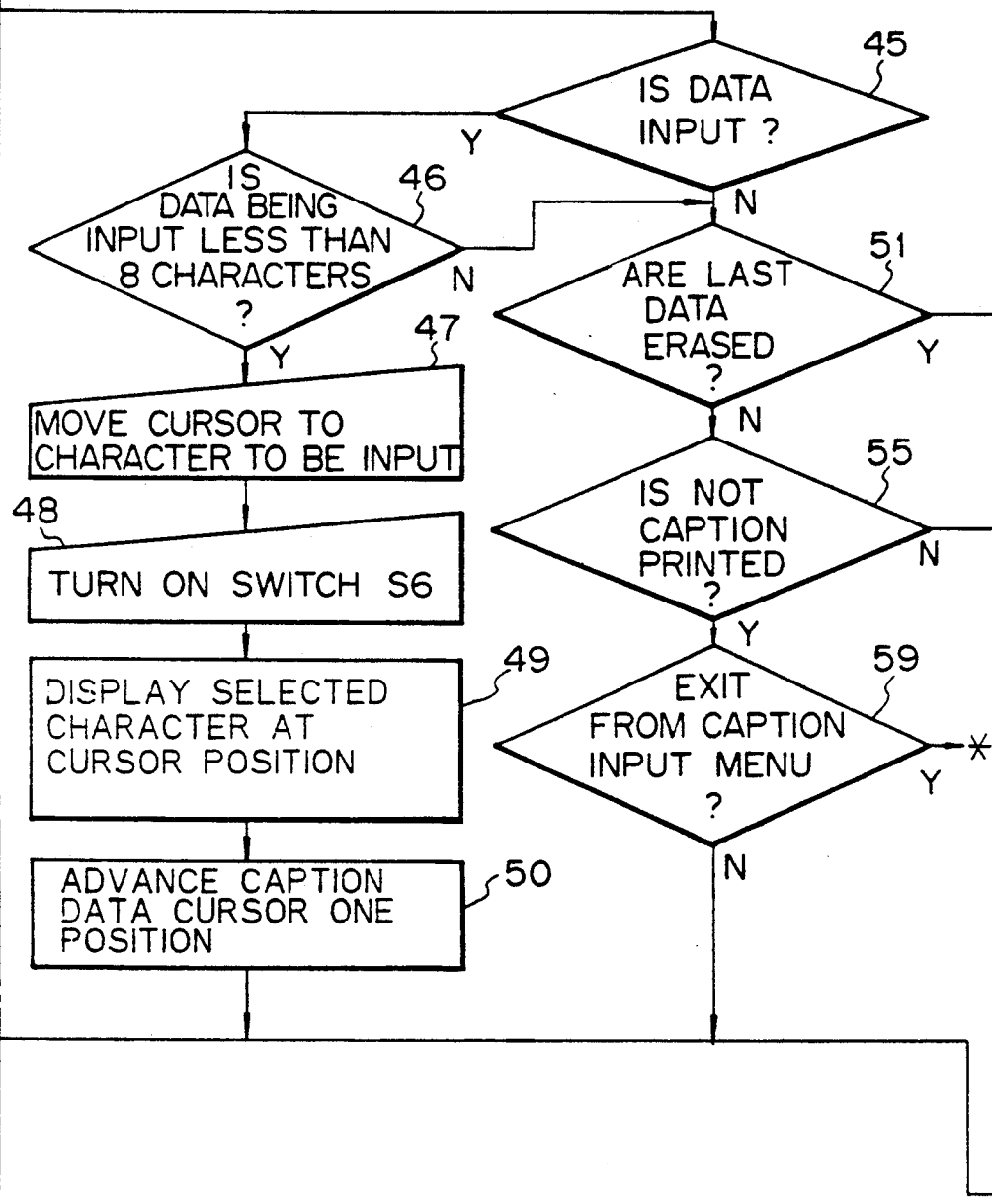
FIG. 3 is a flow chart describing the operation of the embodiment of FIG. 1.
Figure 3C:
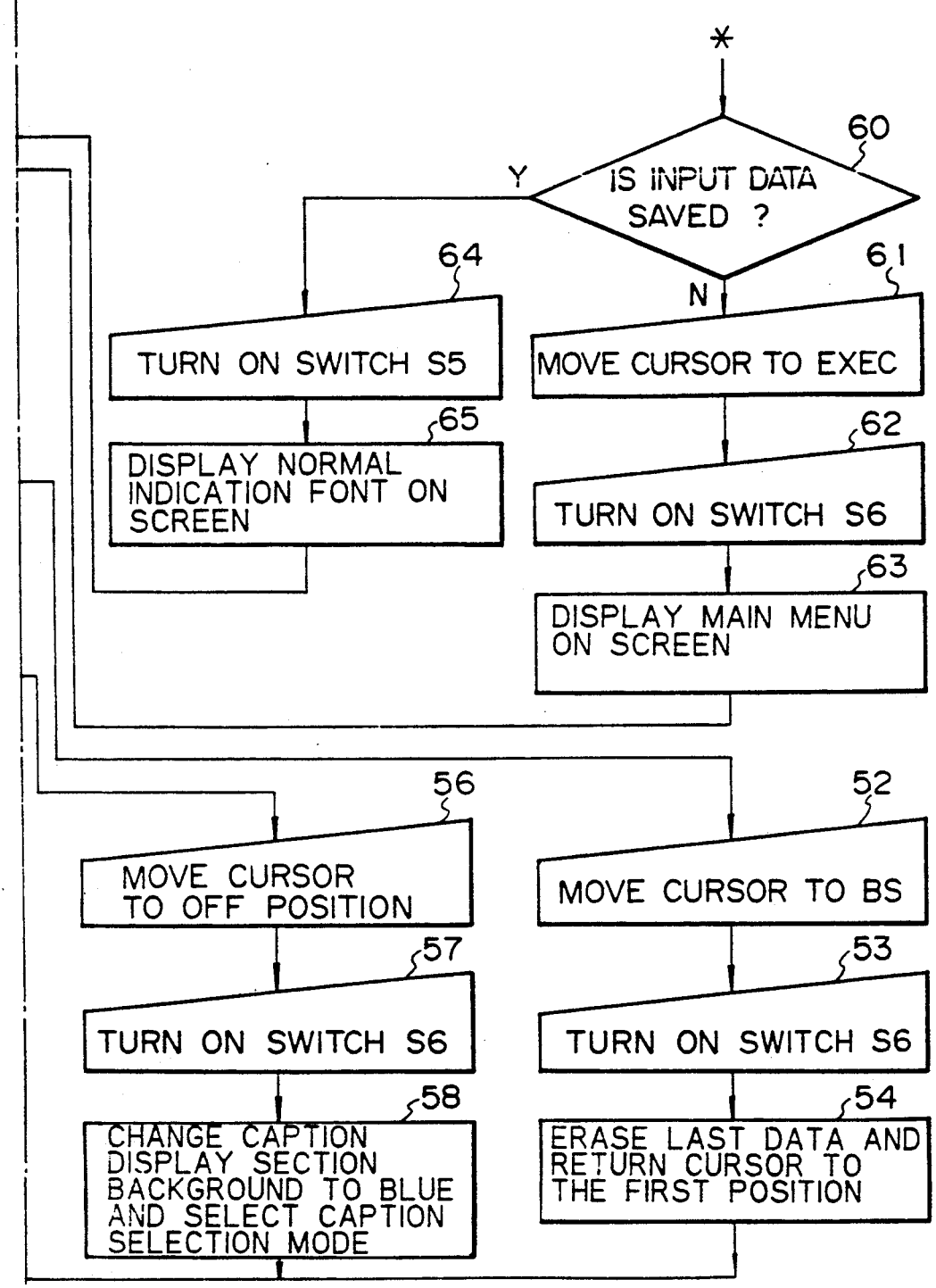

With reference to the flow chart illustrated in FIGS. 3A, 3B, and 3C, the operation of the system will now be described.

In a first determination step 41, it is determined whether the switch S5 (labelled "MENU") is turned on (i.e., actuated), and if yes, the monitor (i.e., video display screen) connected to the printer enters from a normal display mode into a menu display mode wherein a plurality of menus are displayed on the screen. Examples of such menus are a caption menu for inputting caption data, a monitor menu for setting up an output signal which is sent to the monitor (i.e., the selection state of the mode selection switch 3), an input setting menu for setting the selection state of the input selection switch 2, and a print menu for setting up the print operation e.g., setting a number of sheets to be printed, selection of an image to be printed, and so forth.

In step 42, it is determined whether a caption selection mode is selected. When the caption selection mode is selected, the currently stored caption is displayed in step 43. If another mode is selected, then the other selected mode is effected in step 44 as another command.

Figure 4:
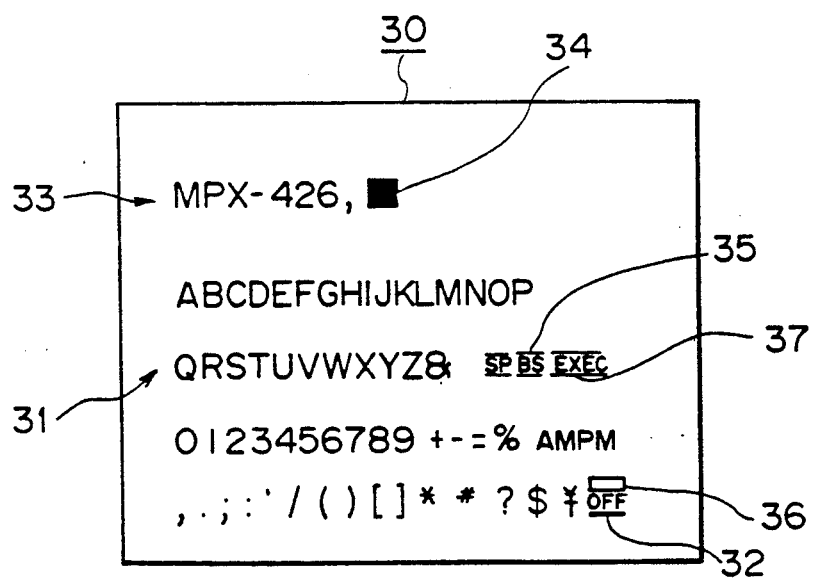
FIG. 4 is a schematic diagram of a display screen.

FIG. 4 is an example of the monitor screen display via which the caption is selected. A display section 30 displays a character information display 31 including symbols such as alphabet characters, symbols, and so forth used for the creation of a caption. When the cursor keys S7 are operated, a first cursor 32 is moved over the various characters, which can be selected one at a time. The stored caption and the currently created caption are displayed at a caption display section 33 which is located at an upper portion of the display section 30. A second cursor 34 identifies the position of a character being created at the caption display section 33.

As illustrated, the character information display 31 contains control symbols 35 ("BS"), 36 ("OFF" or "ON", it varies as will be explained below), and 37 ("EXEC") in addition to the characters for the caption. The functions of the control symbols are explained below.

Caption data selected by the operation of the key switch 19 is sent to the CPU 18 where it is stored in the memory of the CPU 18. In addition, the character display circuit 11 is controlled by the CPU 18 and thereby displays a particular display on the monitor screen.

With reference again to FIGS. 3A-3C, when the cursor keys S7 are operated and a character or symbol is selected for input into the caption being created, in step 45, it is determined whether such character data is to be input, and if yes, in step 46, it is determined whether or not the number of characters of the input data (i.e., the currently being created caption) is less than a particular number, for example, less than eight characters. When the number of characters of the input data is less than eight characters, the cursor 32 is moved to the position of a character to be input in step 47. After all characters for the currently being created caption are designated, the switch S6 is turned on in step 48. Then, the designated character data is read and displayed at the position of the cursor 34 in the caption display section 33 in step 49. Thereafter, in step 50, the cursor 34 in the data display section 33 is moved one position forward, i.e., from left to right, by one position.

If in step 46, it is determined that the caption data being input is greater than the particular number of characters, then the procedure advances to step 51 where it is determined whether previous caption data has been erased. If the last (previous) caption data are cleared (erased), the cursor 34 is moved to the position of the control symbol 35, labelled "BS" (blank screen) in step 52. In step 53, the switch S6 is actuated to select the control command BS. And then in step 54, the last caption data are cleared and the cursor command 34 is returned back to the first position in the display section 33. Then, the procedure returns to step 45.

The caption being created is sent from the CPU 18 to the CPU 17. Thereafter, with a particular timing, the caption is sent from the CPU 17 to the line memory 13. Then, the caption is printed along with the image.

To prohibit the caption from being printed in step 55, the cursor 32 is moved to the position of the control symbol 36 of "OFF" in step 56, which upon selection, effects an "OFF" command which terminates printing. Thereafter, the switch S6 is turned on in step 57 to effect such selection. Thus, the prohibition of the print operation is set. In addition, the color of the caption display 33 of the display section 30 is changed, preferably to blue. Moreover, in step 58, the characters of the control symbol 36 are changed to read "ON" instead of "OFF." Of course, it is also possible to represent that the no-print state exists by blinking the caption display rather than changing the color thereof.

When the caption selection mode is exited in step 59, the procedure proceeds to step 60 where it is determined whether or not the input data is saved. When the input data is saved, the cursor 32 is moved to the control symbol 37 in step 61. Thereafter, the switch S6 is turned on (step 62). Thus, the caption data input is stored. At that time, the display section 30 enters into the mode for displaying a plurality of menus in step 63.

In step 60, it is determined whether the input data was saved. When the input data is not saved, the switch S5 is turned on in step 64. Then, the monitor displays the normal indication font screen in step 65. Thereafter, the mode returns back to the state preceding the first step 41.

It is also possible to contain the image source and/or display unit in the printer itself. In such a case, the monitor would not be externally connected to the printer as it would comprise a portion thereof.

According to the present invention, a caption can be added to an image in an easy operation while observing the screen of a display unit without utilization of a separately connected computer. In addition, since the caption to be added is displayed on the screen of the image display unit, it can be readily checked by viewing that display unit rather than another unit.

While a preferred embodiment has been shown, modifications and changes may become apparent to those skilled in the art which shall fall within the spirit and scope of the invention. It is intended that such modifications and changes be covered by the attached claims.

What is claimed is:

1. A printer for printing image information with character information which is added to said image information, said printer comprising therein:
    a video image input terminal for inputting a video image signal, which signal is for displaying or printing;
    a memory for storing said video image signal;
    a character generator for generating a plurality of kinds of said character information including a menu by means of which characters are registered for printing;
    a display means including a display circuit for displaying said character information from said character generator on a display apparatus which is connected as a peripheral means, and displaying said video image signal for recognizing said image information which is printed;
    a selecting means for selecting desired characters on a screen of said display means from said character information, said selecting means comprising a cursor displayed on said display means and keying means for operating said cursor;
    a control means for controlling said display circuit to display a selected plurality of said character information on said screen, and for determining and storing said desired characters from said character generator selected on said screen by said selecting means, said control means configured to enter a mode during which said desired characters are selected, said control means configured to accept a command from said selection means to enter said mode;
    an adder for adding said video image signal and said selected characters;
    a print means for printing said video image information and said selected characters on a print medium; and
    a housing within which the foregoing, except the display apparatus, are housed.

2. The printer of claim 1, wherein said selected characters are printed on a margin of said image information.

3. The printer of claim 1, wherein said selecting means comprises key means for moving a cursor on the display means.

4. The printer of claim 1, wherein said display means is provided as a peripheral unit.

5. The printer of claim 1, wherein said display means is provided in a body of said printing means.

6. The printer of claim 1, wherein said selected characters are displayed on said displaying means along with said image information.

7. The printer of claim 1, wherein said control means is operable in a mode for selecting said selected characters and said mode is effected by operator selection.

8. The printer of claim 7, wherein in said mode first and second areas are formed in said screen of said display means, a plurality of types of characters are displayed on said first area and selected characters are displayed on said second area for visualization by an operator.

9. The printer of claim 1, wherein a control for registering said characters for print is provided.

10. The printer of claim 1, wherein a control for prohibiting print of said characters selectively is provided.

11. A printer operative to print both a video image and a caption relating thereto, comprising:
input terminals through which one or more video signals are received;
output terminals connectable to a display device and through which are transmitted one or more video signals;
a first memory coupled to said input terminals, said memory being operative to store a video image comprising a portion of said video signals;
a character selection device comprising a keypad and a processing unit;
a second memory coupled between said first memory and said character selection device, said second memory operative to store selected characters for printing as a caption;
a printing mechanism coupled to said first and second memories for selectively printing characters stored in said second memory and said video image stored in said first memory;
a character generator coupled to said character selection device; and
a signal mixer coupled to said output terminals, said character generator, and said first memory so that selected characters can be displayed along with said video image prior to printing of said video image and said caption.

12. The printer of claim 11, wherein said input terminals comprise a first input terminal through which is received an RGB video signal, a second input terminal through which is received a luminance signal Y and a color signal C, and a third input terminal through which is received a composite color video signal.

13. The printer of claim 12, wherein said input terminals further comprise a luminance signal Y and color signal C to RGB signal conversion unit coupled to said second input terminal; a composite color video signal to RGB signal conversion unit coupled to said third input terminal; and a switch for selecting one of said first, second, and third input terminals.

14. The printer of claim 13, wherein said printing mechanism comprises a sublimation type thermal transfer printing mechanism.

* * * * *